US007583806B2

(12) United States Patent
Holmi et al.

(10) Patent No.: US 7,583,806 B2
(45) Date of Patent: Sep. 1, 2009

(54) CONVERTIBLE AUTOMOBILE SOUND SYSTEM EQUALIZING

(75) Inventors: Douglas J. Holmi, Marlborough, MA (US); Guy A. Torio, Ashland, MA (US)

(73) Assignee: Bose Corporation, Framingham, MA (US)

( * ) Notice: Subject to any disclaimer, the term of this patent is extended or adjusted under 35 U.S.C. 154(b) by 550 days.

(21) Appl. No.: 10/457,338

(22) Filed: Jun. 9, 2003

(65) Prior Publication Data

US 2004/0247141 A1 Dec. 9, 2004

(51) Int. Cl.
*H04B 1/00* (2006.01)

(52) U.S. Cl. .......................... 381/86; 381/103; 381/302

(58) Field of Classification Search .................. 381/86, 381/1, 104, 106, 103, 98, 300, 302
See application file for complete search history.

(56) References Cited

U.S. PATENT DOCUMENTS

| | | | | |
|---|---|---|---|---|
| 4,039,755 | A * | 8/1977 | Berkovitz | 381/63 |
| 4,594,729 | A | 6/1986 | Weingartner et al. | |
| 4,597,470 | A | 7/1986 | Takagi | |
| 4,641,344 | A | 2/1987 | Kasai | |
| 4,759,066 | A | 7/1988 | Polk | |
| 4,866,776 | A | 9/1989 | Kasai | |
| 4,903,307 | A | 2/1990 | Ozawa | |
| 5,023,914 | A | 6/1991 | Arnold | |
| 5,111,508 | A * | 5/1992 | Gale et al. | 381/100 |
| 5,200,688 | A | 4/1993 | Patino et al. | |
| 5,208,483 | A | 5/1993 | Reneau | |
| 5,215,346 | A | 6/1993 | Reitzloff | |
| 5,680,468 | A * | 10/1997 | Van Hout et al. | 381/86 |
| 5,929,769 | A | 7/1999 | Garnault | |
| 6,324,451 | B1 | 11/2001 | Regan | |
| 6,389,147 | B1 | 5/2002 | Rush | |
| 7,076,071 | B2 * | 7/2006 | Katz | 381/307 |
| 7,177,432 | B2 * | 2/2007 | Eid et al. | 381/22 |
| 2002/0136414 | A1 | 9/2002 | Jordan et al. | |
| 2004/0042624 | A1 | 3/2004 | Henderson et al. | |
| 2004/0091123 | A1 | 5/2004 | Stark | |
| 2004/0247141 | A1 | 12/2004 | Holmi et al. | |
| 2005/0100174 | A1 | 5/2005 | Stark et al. | |

FOREIGN PATENT DOCUMENTS

| | | |
|---|---|---|
| EP | 0 729 227 | 8/1996 |
| EP | 1 137 319 | 9/2001 |
| EP | 0729227 B1 | 7/2002 |
| EP | 1487236 | 12/2004 |
| JP | 2006-109479 | 4/2006 |
| WO | WO 03/001885 | 1/2003 |

OTHER PUBLICATIONS

Search Report from counterpart European application No. 04102444.9 dated Mar. 10, 2008.

(Continued)

*Primary Examiner*—Vivian Chin
*Assistant Examiner*—Con P Tran
(74) *Attorney, Agent, or Firm*—Fish & Richardson P.C.

(57) ABSTRACT

A convertible automobile sound system is responsive to the state of the convertible automobile top for providing equalization to speakers related to the state of the convertible top.

13 Claims, 6 Drawing Sheets

OTHER PUBLICATIONS

Search Report from related European application No. 05108733.6 dated Mar. 2, 2007.

Press release from Infinity Mobile Systems, "Infinity Audio System Featured in Custom Chrysler PT Cruiser at 2002 SEMA Show" Nov. 5, 2002.

Translation of Official Action from Related Chinese Application No. 2004100452310 dated Mar. 2, 2007.

European Search Report dated Mar. 2, 2007, issued in related European Application No. 05108733.6.

European Examination Report dated Mar. 7, 2007, issued in related European Application No. 04102444.9.

EP Examination Report in related Application No. 05108733.6, Oct. 30, 2007.

Action and Response History retrieved from PAIR for U.S. Appl. No. 10/290,989, through Jun. 30, 2008.

Action and Response History retrieved from PAIR for U.S. Appl. No. 11/933,148, through Jun. 30, 2008.

Action and Response History retrieved from PAIR for U.S. Appl. No. 11/933,183, through Jun. 30, 2008.

Action and Response History retrieved from PAIR for U.S. Appl. No. 11/933,172, through Jun. 30, 2008.

Action and Response History retrieved from PAIR for U.S. Appl. No. 11/933,164, through Jun. 30, 2008.

Communication from counterpart Japanese application dated Mar. 24, 2009.

* cited by examiner

CONVERTIBLE AUTOMOBILE SOUND SYSTEM EQUALIZING

The invention relates in general to convertible automobile sound system equalizing, and more particularly concerns novel apparatus and techniques for adjusting the convertible automobile sound system equalization in response to the state of the convertible top.

BACKGROUND OF THE INVENTION

For background, reference is made to U.S. Pat. No. 5,023,914 disclosing nonminimum phase equalization of a vehicle sound system, and U.S. application Ser. No. 10/290,989, filed on Nov. 8, 2002, disclosing a dual-mode sound system having optimized modes corresponding to different configurational states of an automobile, the entire content of which are incorporated herein by reference.

SUMMARY OF THE INVENTION

In a convertible automobile, there is a sound system with equalization circuitry. A sensor provides a top state signal representative of the state of the convertible top. The equalization circuitry responds to the top state signal to provide equalization representative of the state of the top. In a specific form of the invention, the convertible automobile includes left and right dash speakers, and the equalization circuitry includes left and right equalization circuitry responsive to the top state signal for providing top up equalization when the top is up and top down equalization when the top is down. The sound system may also include door speakers with door speaker equalization circuitry responsive to the top state signal for providing top up equalization when the top is up and top down equalization when the top is down. The sound system may also include seat speakers in the seats and seat speaker equalization circuitry responsive to the top state signal for providing top up equalization when the top is up and top down equalization when the top is down. The sound system may also include a center dash speaker and center dash speaker equalization circuitry responsive to the top state signal for providing top up equalization when the top is up and top down equalization when the top is down.

Equalization circuitry as used herein means circuitry that coacts with other elements of the sound system so that the radiated acoustic power into the convertible automobile listening area varies as a function of frequency in a predetermined fashion over a substantial portion of the range of audible frequencies.

Other features, objects and advantages of the invention will become apparent from the following detailed description when read in connection with the accompanying drawing in which:

DETAILED DESCRIPTION

Figure 1:
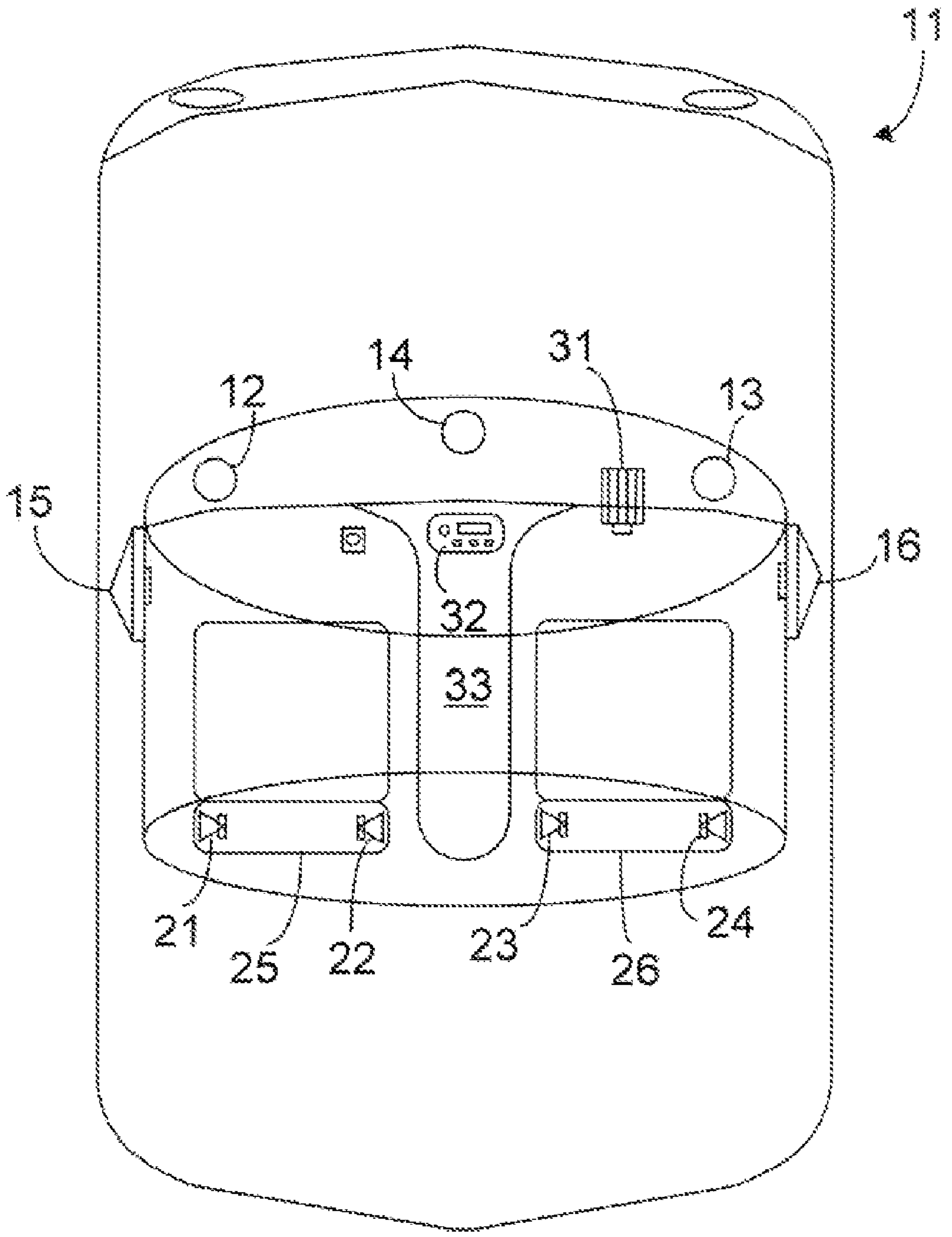
FIG. 1 is a top pictorial view of a convertible automobile sound system according to the invention in a convertible automobile in an exemplary embodiment.

With reference now to the drawings, and more particularly FIG. 1, there is shown a pictorial representation of a convertible automobile sound system according to the invention seated in convertible automobile 11. There are left, right and center dash speakers 12, 13 and 14, respectively, seated on the convertible automobile dash. There are left and right door speakers 15 and 16, respectively, mounted to the front doors. There are rear speakers including left seat, left channel speaker 21, left seat, right channel speaker 22, right seat, left channel speaker 23, right seat, right channel speaker 24 mounted in or adjacent to the left and right seats 25 and 26. A seven-channel amplifier 31 including the equalization circuitry may be mounted under the passenger floor mat. A sound system control panel 32 may be mounted on the dash above the center console 33.

Figure 2:
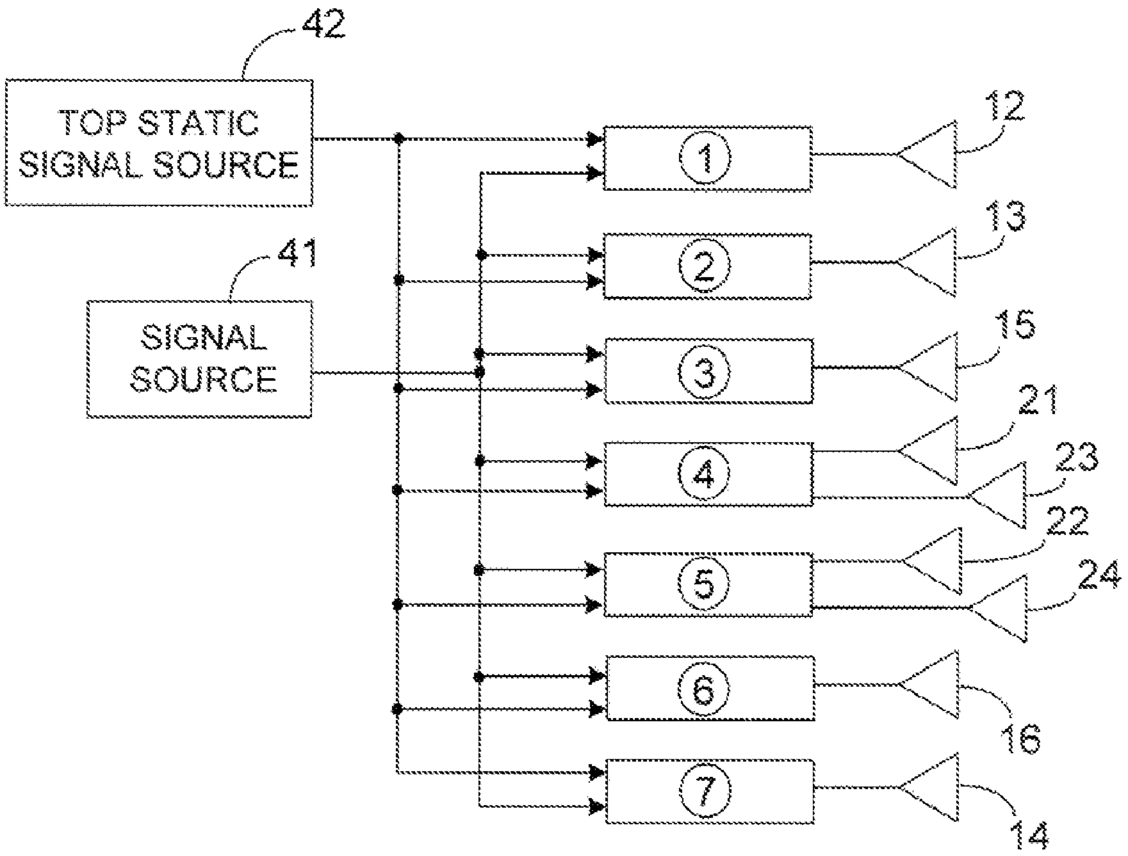
FIG. 2 is a block diagram of a system for providing an audio signal to energize the sound system of FIG. 1

Referring to FIG. 2, there is shown a block diagram illustrating the logical arrangement of the system for energizing the different speakers with seven channels in the exemplary embodiment. There is a signal source 41 that furnishes sound signals to channels 1-7, respectively. Each channel also receives a signal from top state signal source 42 representative of the state of the convertible top. Channel 1 energizes left dash speaker 12 with a front left input signal. Channel 2 energizes right dash speaker 13 with front right input signal. Channel 3 energizes left door speaker 15 with front left input signal. Channel 4 energizes left channel rear speakers 21 and 23 with left rear input signal. Channel 5 energizes right channel rear speakers 22 and 24 with rear right input signal. In one embodiment, channels 4 and 5 are left and right surround channels. Channel 6 energizes right door speaker 16 with front right input signal. Channel 7 energizes center dash speaker 14 with a mono signal that is half the sum of the left and right front input signals.

Figure 3:
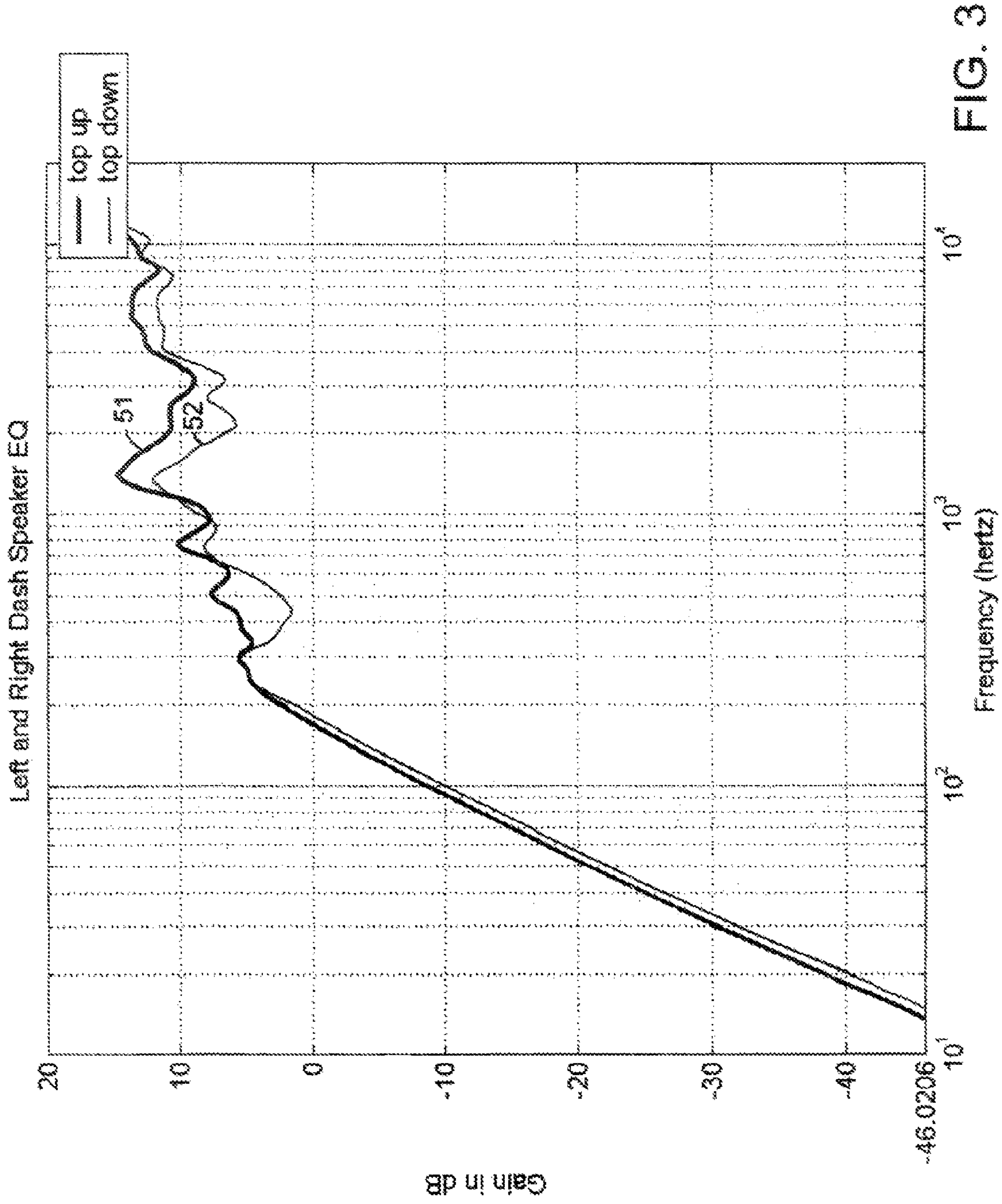
FIG. 3 is a graphical representation of the top up and top down equalization furnished by the left and right dash speaker equalization circuitry.

Referring to FIG. 3, there is shown the top up equalization 51 and top down equalization 52 furnished by channels 1 and 2 to left and right dash speakers 12 and 13, respectively.

Figure 4:
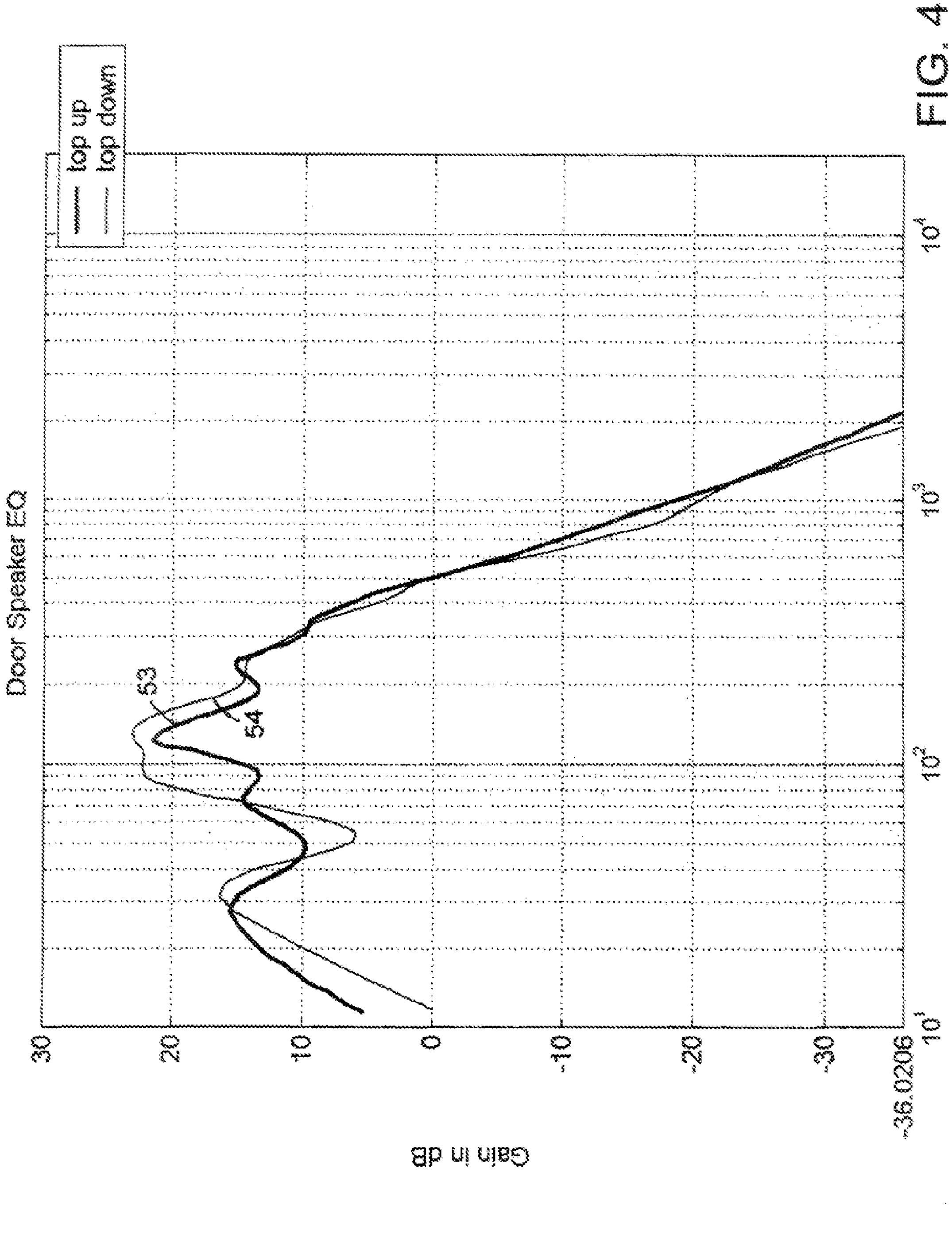
FIG. 4 is a graphical representation of the top up and top down equalization furnished by the center dash speaker equalization circuitry.

Referring to FIG. 4, there is shown top up equalization 53 and top down equalization 54 furnished by channels 3 and 6 to left and right door speakers 15 and 16, respectively.

Figure 5:
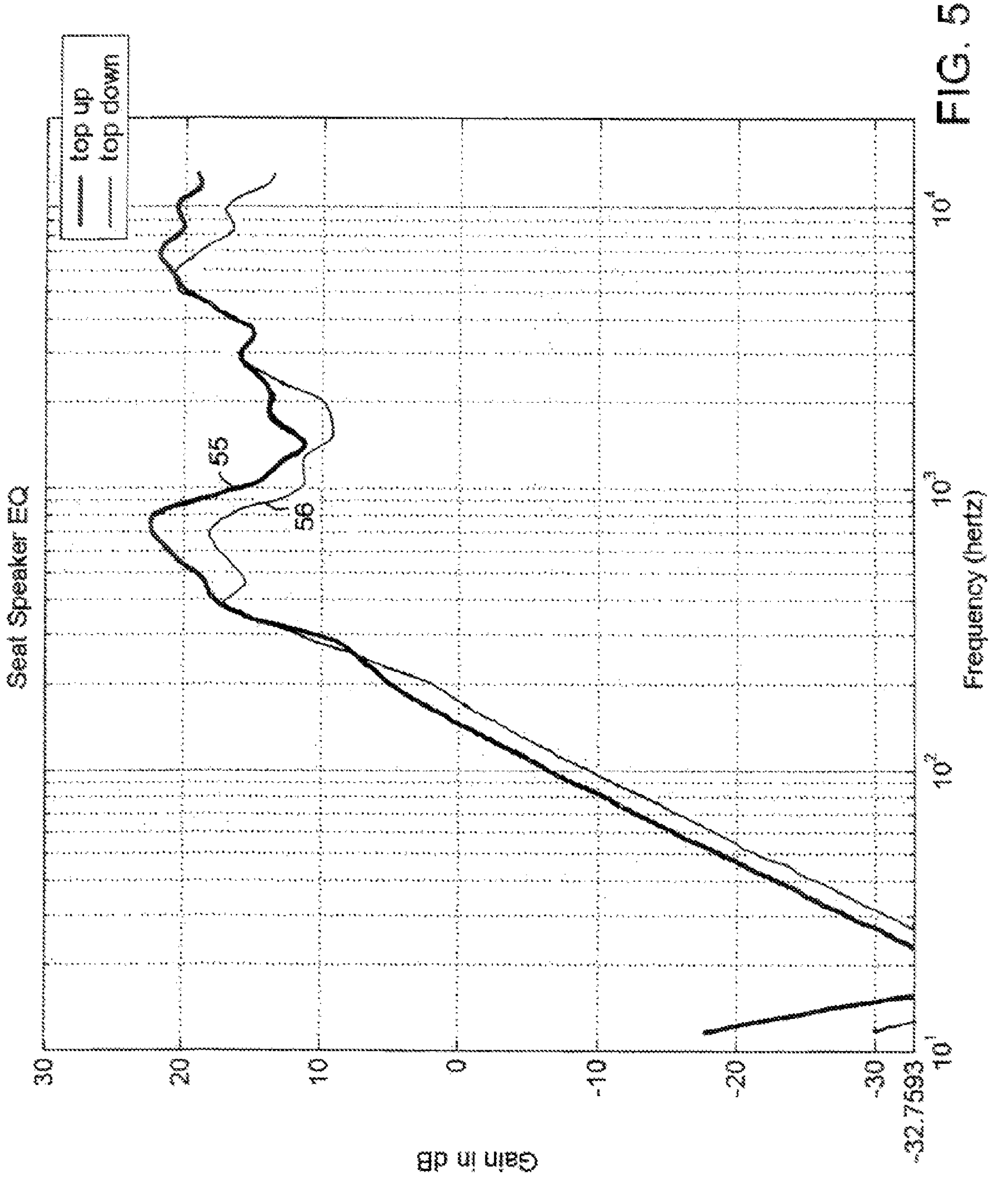
FIG. 5 is a graphical representation of the top up and top down equalization furnished by the door speaker equalization circuitry.

Referring to FIG. 5, there is shown top up equalization 55 and top down equalization 56 furnished by channels 4 and 5 to left channel rear speakers 21, 23 and right channel rear speakers 22, 24, respectively.

Figure 6:
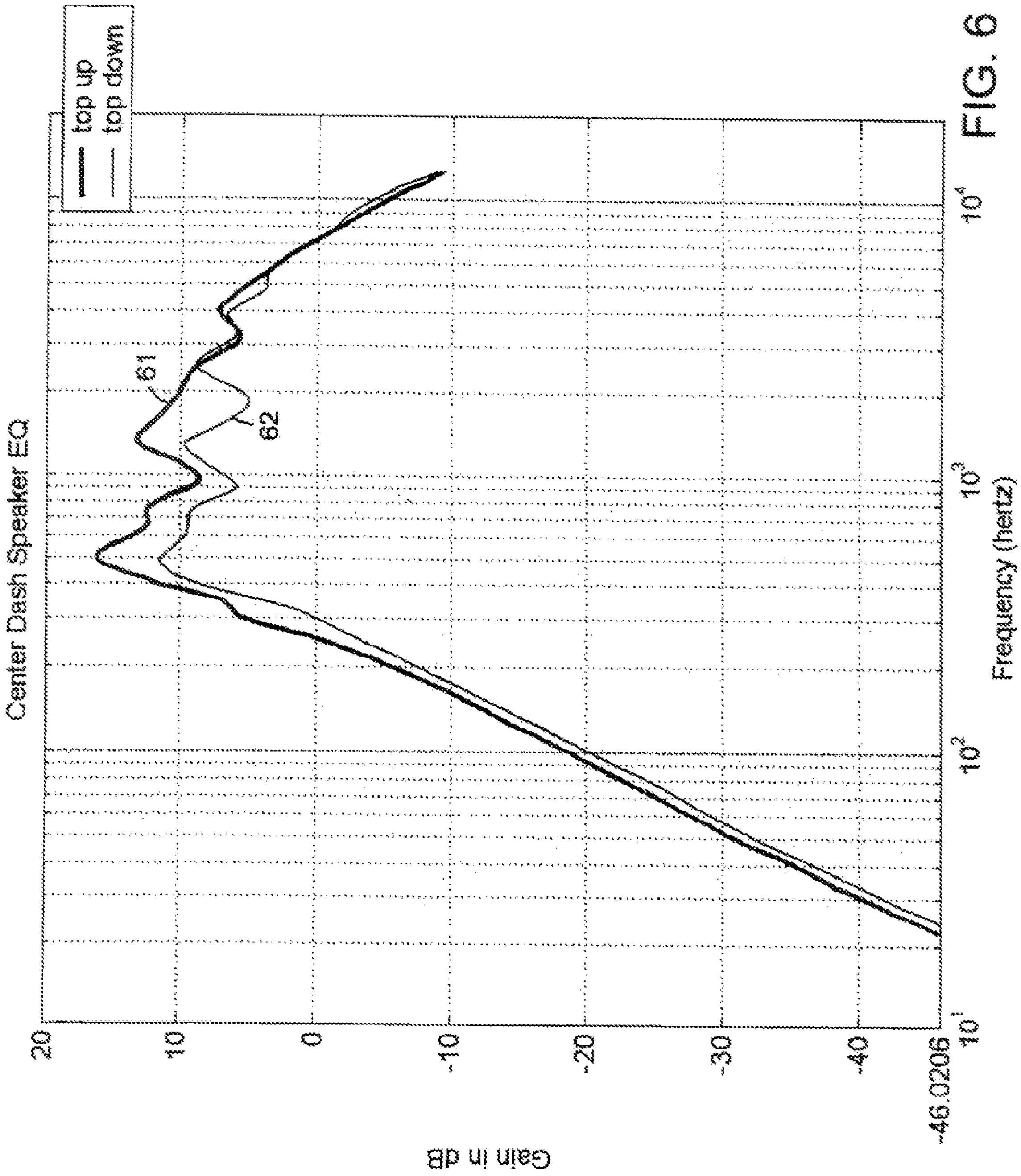
FIG. 6 is a graphical representation of the top up and top down equalization furnished by the seat speaker equalization circuitry.

Referring to FIG. 6, there is shown top up equalization 61 and top down equalization 62 furnished by channel 7 to center dash speaker 14.

Preferably, the system is constructed and arranged to furnish minimum phase magnitude equalization for all amplifier/speaker channels, phase alignment equalization using all pass filter stages and/or delays for coherent and/or intentional incoherent acoustic energy addition and delay acoustic energy of rear speakers with respect to front speakers to create a front dominant sound stage with an enhanced sense of spaciousness.

In practicing the invention, the associated top up mode is generally tuned for determining minimum phase magnitude equalization, phase alignment equalization and delay. The top down mode may be established by adjusting the magnitude equalization by using the difference in the speaker raw acoustics between the top down and top up case. Preferably, there are different delay and polarity relationships between the front and rear channels in the top down mode to create similar spatial and spectral impressions to those obtained in the top up mode. In the top up mode in this example, signals to the rear speakers were delayed 5 ms with respect to signals to the front speakers, and the polarity of signals to the rear speakers was reversed with respect to signals to the front speakers. In the top down mode, the rear signals to the rear speakers were delayed 6 ms with respect to signals to the front speakers, and the polarity of signals to the rear speakers with respect to signals to the front speakers was not reversed.

This approach can be applied to more complex systems, and is not limited with respect to which signal processing channel nonminimum phase property is varied with respect to which other channel. In this specific example, signals to rear speakers were delayed with respect to signals to front speakers, but other systems may relatively delay signals to other sets of speakers.

There has been described novel apparatus and techniques for a convertible automobile sound system. It is evident that those skilled in the art may now make numerous uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited only by the spirit and scope of the appended claims.

What is claimed is:

1. A sound system for a convertible automobile having a convertible automobile top, the sound system comprising:
- a front loudspeaker;
- a rear loudspeaker;
- an input to receive a top state signal representative of a state of the convertible automobile top; and
- equalization circuitry coupled to said front and rear loudspeakers and responsive to said top state signal;
- the equalization circuitry configured to provide equalization based on the state of the convertible top by:
  - selecting a first non-zero amount of delay when the convertible top is in a first state;
  - selecting a second non-zero amount of delay when the convertible top is in a second state; and
  - delaying, by the first non-zero amount of delay when the convertible top is in the first state and the second non-zero amount of delay when the convertible top is in the second state, signals sent to one of the loudspeakers with respect to signals sent to the other loudspeaker.

2. The sound system of claim 1 also comprising changing a polarity relationship between signals for the front loudspeaker and signals for the rear loudspeaker based on the state of the convertible top.

3. The sound system of claim 2 in which the signals for the rear loudspeaker comprise surround sound signals.

4. The sound system of claim 1 in which selecting the first delay comprises delaying the signals for the rear loudspeaker 5 ms relative to the signals for the front speakers when the top is in an up state and delaying the signals for the rear loudspeaker 6 ms relative to the signals for the front speakers when the top is in a down state.

5. The sound system of claim 1 further comprising reversing a polarity of signals for the rear speakers relative to a polarity of signals for the front speakers when the top is in an up state and not reversing the polarity when the top is in a down state.

6. A method comprising:
- in a sound system for an automobile having a convertible top, receiving a top state signal representative of a state of the convertible top; and
- providing equalization based on the state of the convertible top by:
  - selecting a first non-zero amount of delay when the convertible top is in a first state;
  - selecting a second non-zero amount of delay when the convertible top is in a second state; and
  - delaying, by the first non-zero amount of delay when the convertible top is in the first state and the second non-zero amount of delay when the convertible top is in the second state, signals sent to one of the loudspeakers with respect to signals sent to the other loudspeaker.

7. The method of claim 6 also comprising changing a polarity relationship between signals for the front loudspeaker and signals for the rear loudspeaker based on the state of the convertible top.

8. The method of claim 6 in which selecting the first delay comprises delaying the signals for the rear loudspeaker 5 ms relative to the signals for the front speakers when the top is in an up state and delaying the signals for the rear loudspeaker 6 ms relative to the signals for the front speakers when the top is in a down state.

9. The method of claim 6 further comprising reversing a polarity of signals for the rear speakers relative to a polarity of signals for the front speakers when the top is in an up state and not reversing the polarity when the top is in a down state.

10. A computer-readable medium bearing instructions to
- receive a top state signal representative of a state of a convertible top of an automobile; and
- cause components of a sound system for the automobile to provide equalization based on the state of the convertible top by:
  - selecting a first non-zero amount of delay when the convertible top is in a first state;
  - selecting a second non-zero amount of delay when the convertible top is in a second state; and
  - delaying, by the first non-zero amount of delay when the convertible top is in the first state and the second non-zero amount of delay when the convertible top is in the second state, signals sent to one of the loudspeakers with respect to signals sent to the other loudspeaker.

11. The medium of claim 10 also comprising changing a polarity relationship between signals for the front loudspeaker and signals for the rear loudspeaker based on the state of the convertible top.

12. An apparatus comprising:
- an input to receive a top state signal representative of a state of a convertible automobile top; and
- equalization circuitry coupled to a front loudspeaker and a rear loudspeaker and responsive to said top state signal;
- the equalization circuitry configured to provide equalization based on the state of the convertible top by:
- selecting a first non-zero amount of delay when the convertible top is in a first state;
  - selecting a second non-zero amount of delay when the convertible top is in a second state; and
  - delaying, by the first non-zero amount of delay when the convertible top is in the first state and the second non-zero amount of delay when the convertible top is in the second state, signals sent to one of the loudspeakers with respect to signals sent to the other loudspeaker.

13. The apparatus of claim 12 also comprising changing a polarity relationship between signals for the front loudspeaker and signals for the rear loudspeaker based on the state of the convertible top.

* * * * *

UNITED STATES PATENT AND TRADEMARK OFFICE

CERTIFICATE OF CORRECTION

PATENT NO. : 7,583,806 B2
APPLICATION NO. : 10/457338
DATED : September 1, 2009
INVENTOR(S) : Holmi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Fourteenth Day of September, 2010

David J. Kappos
*Director of the United States Patent and Trademark Office*